(12) United States Patent
Park et al.

(10) Patent No.: US 12,423,436 B2
(45) Date of Patent: Sep. 23, 2025

(54) ELECTRONIC DEVICE AND METHOD FOR APPLYING SECURE BOOTING TO ELECTRONIC DEVICE

(71) Applicant: Samsung Electronics Co., Ltd., Suwon-si (KR)

(72) Inventors: Byunghee Park, Suwon-si (KR); Elmurod Talipov, Suwon-si (KR); Hyeonseung Son, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 178 days.

(21) Appl. No.: 18/501,678

(22) Filed: Nov. 3, 2023

(65) Prior Publication Data

US 2024/0078317 A1    Mar. 7, 2024

Related U.S. Application Data

(63) Continuation of application No. PCT/KR2022/006561, filed on May 9, 2022.

(30) Foreign Application Priority Data

May 18, 2021 (KR) .................. 10-2021-0064215

(51) Int. Cl.
*G06F 15/177* (2006.01)
*G06F 9/00* (2018.01)
*G06F 9/4401* (2018.01)
*G06F 21/57* (2013.01)

(52) U.S. Cl.
CPC ............ *G06F 21/575* (2013.01); *G06F 9/441* (2013.01)

(58) Field of Classification Search
CPC .......... G06F 21/575; G06F 9/441; G06F 8/65; G06F 21/57; G06F 21/60; G06F 8/71; G06F 21/602
See application file for complete search history.

(56) References Cited

U.S. PATENT DOCUMENTS

| 5,828,831 A | 10/1998 | Kong |
| 8,135,945 B2 | 3/2012 | Gehrmann |
| 8,214,632 B2 | 7/2012 | Choi et al. |
| 9,183,414 B2 | 11/2015 | Lim |

(Continued)

FOREIGN PATENT DOCUMENTS

| KR | 10-0319838 B1 | 4/2002 |
| KR | 10-2008-0090771 A | 10/2008 |

(Continued)

OTHER PUBLICATIONS

International Search Report dated Aug. 5, 2022, issued in International Patent Application No. PCT/KR2022/006561.

*Primary Examiner* — Xuxing Chen
(74) *Attorney, Agent, or Firm* — Jefferson IP Law, LLP

(57) ABSTRACT

An electronic device and a method of applying secure booting to the electronic device are provided. The electronic device executes a boot loader, identifies whether a private key is stored in an eFuse, identifies whether the boot loader is a secure system that executes secure booting by using the private key, determines a booting mode based on a result of the identification, and records an encryption key in the eFuse by using a special system loaded from an external memory card, according to the determined booting mode.

15 Claims, 10 Drawing Sheets

(56) References Cited

U.S. PATENT DOCUMENTS

| | | |
|---|---|---|
| 9,223,982 B2 | 12/2015 | Adams et al. |
| 10,691,447 B2* | 6/2020 | Visinescu ............. G06F 21/575 |
| 10,691,467 B2 | 6/2020 | Lin et al. |
| 10,878,098 B2 | 12/2020 | Jang et al. |
| 2008/0235517 A1* | 9/2008 | Ohmori ................ H04L 9/0891 |
| | | 713/187 |
| 2011/0066787 A1 | 3/2011 | Markey et al. |
| 2011/0078429 A1* | 3/2011 | Yang ........................ G06F 9/441 |
| | | 713/2 |
| 2012/0331304 A1* | 12/2012 | She ........................ G06F 21/85 |
| | | 713/189 |
| 2013/0185548 A1* | 7/2013 | Djabarov ............ G06F 11/1433 |
| | | 713/2 |
| 2015/0286823 A1 | 10/2015 | Elnekaveh et al. |
| 2017/0337380 A1 | 11/2017 | Domke et al. |
| 2018/0032734 A1* | 2/2018 | Gunti .................... G06F 21/575 |
| 2018/0260568 A1* | 9/2018 | Cisneros ................. G06F 21/79 |
| 2018/0276387 A1* | 9/2018 | Liu ........................ G06F 21/575 |
| 2018/0309570 A1* | 10/2018 | Amini .................... H04W 48/20 |
| 2019/0012483 A1* | 1/2019 | Thompson ............... G06F 21/78 |
| 2019/0349202 A1* | 11/2019 | Ling ........................ H04L 9/30 |
| 2020/0226264 A1* | 7/2020 | Xu ........................ G06F 9/4401 |
| 2020/0302062 A1* | 9/2020 | Rizos .................... H04L 9/3247 |
| 2020/0311278 A1 | 10/2020 | Lin |
| 2021/0097185 A1* | 4/2021 | Gilton ................... G06F 21/575 |

FOREIGN PATENT DOCUMENTS

| | | |
|---|---|---|
| KR | 10-2009-0093661 A | 9/2009 |
| KR | 10-1209252 B1 | 12/2012 |
| KR | 10-2015-0103376 A | 9/2015 |
| KR | 10-1988404 B1 | 7/2019 |

* cited by examiner

<ENCRYPTION KEY RECORDING MODE>

<ENCRYPTION KEY RECORDING MODE>

ELECTRONIC DEVICE AND METHOD FOR APPLYING SECURE BOOTING TO ELECTRONIC DEVICE

CROSS-REFERENCE TO RELATED APPLICATION(S)

This application is a continuation application, claiming priority under § 365(c), of an International application No. PCT/KR2022/006561, filed on May 9, 2022, which is based on and claims the benefit of a Korean patent application number 10-2021-0064215, filed on May 18, 2021, in the Korean Intellectual Property Office, the disclosure of which is incorporated by reference herein in its entirety.

BACKGROUND

1. Field

The disclosure relates to an electronic device and a method of applying secure booting to the electronic device. More particularly, the disclosure relates to a method of applying secure booting by using a boot loader obtained from the outside, an electronic device supporting multi-booting, and an electronic device performing secure booting.

2. Description of Related Art

With a rapid growth of the Internet of Things (IoT) field, the amount of data transmitted and received through a wired/wireless network is increasing exponentially. Accordingly, data security has become a major issue. In particular, because external leakage of personal information or confidential information is a big problem, a demand for thorough data security is increasing.

Recently, IoT technology and home appliances are combined to perform data communication with an external device or server through a wired/wireless network even in, for example, a refrigerator, an electric oven, a robot vacuum cleaner, a washing machine, or an air conditioner. Because even home appliances can store personal information such as user account information and home appliance use history information, there is a risk that personal information may be leaked to the outside, when a program code constituting an operating system of the home appliances is hacked from the outside or modulated. Therefore, data security of a system is important, and it is necessary to apply secure booting for data security.

According to the prior art, secure booting is applied to an electronic device by using a method of directly recording a private key to an eFuse by using an additional program provided by a manufacturer of a processor included in an electronic device. However, a method of recording a private key by applying programs respectively provided by a manufacturer for electronic devices one by one is not suitable for mass production and requires a lot of time and a lot of money. In addition, in order to use programs provided by processor manufacturers, it is inconvenient to follow system settings set by each manufacturer.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a method capable of applying secure booting without a program provided by a manufacturer of a processor, and an electronic device.

Another aspect of the disclosure is to provide a method of recording an encryption key to an eFuse by using a multi-booting mode and applying secure booting, and an electronic device that performs secure booting.

Additional aspects will be set forth in part in the description which follows and, in part, will be apparent from the description, or may be learned by practice of the presented embodiments.

In accordance with an aspect of the disclosure, an electronic device is provided. The electronic device includes an eFuse storing a private key used in secure booting, a memory storing at least one program code associated with a boot loader, and a processor configured to execute the at least one program code. The processor is further configured to execute the boot loader stored in the memory in response to power being applied to the electronic device or the power being reset, identify the private key pre-stored in the eFuse, identify whether the boot loader is a secure system that executes secure booting by using the private key, based on a result of the identifying of whether the boot loader is a secure system, determine a booting mode, and based on the determined booting mode, record an encryption key in the eFuse by loading a special system stored in an external memory card.

In an embodiment, when the boot loader is identified as a secure system that executes secure booting, the at least one processor may be configured to identify whether multi-booting using a boot loader other than the boot loader pre-stored in the memory is possible.

In an embodiment, the at least one processor may be configured to determine the booting mode to be the multi-booting mode, and may boot by using the special system stored in the external memory card through the multi-booting mode.

In an embodiment, when the boot loader is identified as a normal system that does not perform secure booting, the at least one processor may be configured to determine the booting mode to be an update mode, and update the boot loader by using the special system stored in the external memory card.

In an embodiment, after performing a key burn that records the encryption key in the eFuse, the processor may be configured to update the boot loader with the secure system.

In an embodiment, the processor may be configured to obtain update data including a program code for updating the boot loader with the secure system from the external memory card, and update the boot loader with the secure system by using the obtained update data.

In an embodiment, the electronic device further includes a communication interface configured to perform data communication with a server through a wired/wireless network. The processor may be configured to control the communication interface to obtain update data including a program code for updating the boot loader with the secure system from the external memory card, and update the boot loader with the secure system by using the obtained update data.

In an embodiment, the processor may be configured to generate a decryption key by decrypting the encryption key by using the special system, and record the generated decryption key in the eFuse.

In an embodiment, the eFuse may be a One Time Programmable (OTP) memory device capable of writing the encryption key only once.

In an embodiment, in response to the electronic device being rebooted, the processor may be configured to perform secure booting by using the encryption key recorded in the eFuse.

In accordance with another aspect of the disclosure, a method of applying secure booting to an electronic device is provided. The method includes, in response to power being applied to the electronic device or the power being reset, executing a boot loader stored in a memory of the electronic device, identifying a private key pre-stored in an eFuse included in the electronic device, identifying whether the boot loader is a secure system that executes secure booting by using the private key, based on a result of the identifying of whether the boot loader is a secure system, determining a booting mode, and based on the determined booting mode, recording an encryption key in the eFuse by using a special system loaded from an external memory card.

In an embodiment, the method further includes, when the boot loader is identified as a secure system that executes secure booting, identifying whether multi-booting using a boot loader other than the boot loader pre-stored in the memory is possible.

In an embodiment, the determining of the booting mode includes determining the booting mode to be the multi-booting mode, and the method further includes booting using the special system stored in the external memory card through the multi-booting mode.

In an embodiment, when the boot loader is identified as a normal system that does not perform secure booting, the determining of the booting mode includes determining the booting mode to be an update mode, and the method further includes updating the boot loader by using the special system stored in the external memory card.

In an embodiment, the method further includes, after the recording of the encryption key in the eFuse, updating the boot loader with the secure system.

In an embodiment, the updating of the boot loader with the secure system includes downloading update data including a program code for updating the boot loader with the secure system from a server, and updating the boot loader with the secure system by using the downloaded update data.

In an embodiment, the recording of the encryption key in the eFuse includes generating a decryption key by decrypting the encryption key by using the special system, and recording the generated decryption key in the eFuse.

In an embodiment, the eFuse may be a One Time Programmable (OTP) memory device capable of writing the encryption key only once.

In an embodiment, the method further includes, in response to the electronic device being rebooted, performing secure booting by using the encryption key recorded in the eFuse.

In accordance with another aspect of the disclosure, a computer program product is provided. The computer program product includes a non-transitory computer-readable recording medium that has recorded thereon a computer program executable on a computer.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
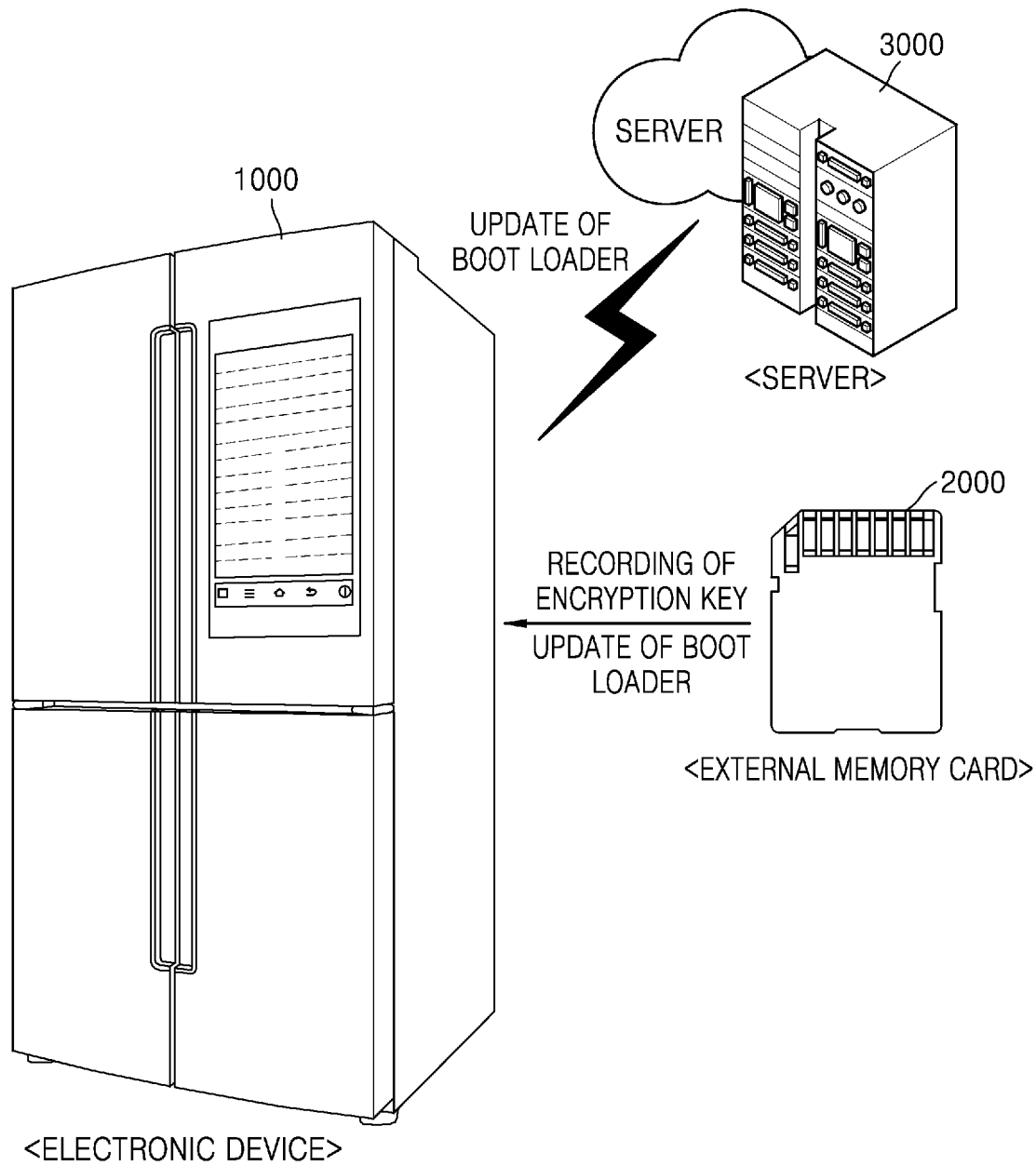
FIG. 1 is a conceptual diagram for explaining a method of applying secure booting to an electronic device, according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Unless otherwise defined, all terms (including technical and scientific terms) used herein have the same meaning as commonly understood by one of ordinary skill in the art to which this disclosure belongs.

The terms "comprises" and/or "comprising" or "includes" and/or "including" used herein specify the presence of stated elements, but do not preclude the presence or addition of one or more other elements. The terms "unit", "-er (-or)", and "module" when used in this specification refers to a unit in which at least one function or operation is performed, and may be implemented as hardware, software, or a combination of hardware and software.

The expression "configured to (or set to)" used therein may be used interchangeably with, for example, "suitable for", "having the capacity to", "designed to", "adapted to", "made to", or "capable of", according to situations. The expression "configured to (or set to)" may not only necessarily refer to "specifically designed to" in terms of hardware. Instead, in some situations, the expression "system configured to" may refer to a situation in which the system is "capable of" together with another device or component parts. For example, the phrase "a processor configured (or set) to perform A, B, and C" may refer to a dedicated processor (such as an embedded processor) for performing a corresponding operation, or a generic-purpose processor (such as a central processing unit (CPU) or an application processor (AP)) that can perform a corresponding operation by executing one or more software programs stored in a memory.

In the disclosure, 'booting' refers to an operation of reading an operating system (OS) stored in an auxiliary memory device, for example, a flash memory or a hard disk, and preparing to perform a function in response to power being applied to an electronic device or being reset. When booting, the electronic device first executes a program code included in a boot read only memory (ROM) to call a boot loader, and then the boot loader loads the OS stored in the auxiliary memory device into a memory device.

In the disclosure, the 'boot loader' refers to a program for performing all related tasks necessary for a kernel to operate correctly and finally operating the OS while being pre-executed before the OS is started. According to an embodiment, the boot loader may be stored in the memory of the electronic device. For example, the boot loader may be stored in a flash memory.

In the disclosure, 'secure booting' is a booting mode for booting by using a private key recorded in an eFuse. The electronic device may perform secure booting by decrypting the boot loader stored in the flash memory by using the private key recorded in the eFuse.

In the disclosure, a 'secure system' is a boot loader that encrypts a normal system by using a private key and a public key. The secure system may perform secure booting by using the private key stored in an eFuse. In the secure system, booting is not possible when the private key is not stored in the eFuse.

In the disclosure, a 'normal system' is a boot loader capable of booting without a private key.

In the disclosure, a 'special system' is a boot loader customized to perform a key burn operation that records an encryption key to an eFuse. According to an embodiment of the disclosure, the special system may be stored in an external memory card. However, embodiments of the disclosure are not limited thereto.

Embodiments of the disclosure now will be described more fully hereinafter with reference to the accompanying drawings.

FIG. 1 is a conceptual diagram for explaining a method of applying secure booting to an electronic device according to an embodiment of the disclosure.

An electronic device 1000 according to the disclosure may be an Internet of Thing (IoT) device that performs data communication with an external device or a server 3000 through a wired/wireless network and executes an application to perform a function or operation. In the embodiment shown in FIG. 1, the electronic device 1000 may be a refrigerator including a display displaying a graphic user interface (UI) according to the execution of the application. The electronic device 1000 may perform a shopping function such as purchasing food ingredients, identify what food is stored through a camera lens by using a food artificial intelligence model (AI), or set an expiration date through a Smart Things application by executing a shopping application. However, embodiments of the disclosure are not limited thereto. The electronic device 1000 may be, for example, another home appliance such as an electric oven, an air conditioner, a washing machine, a television, or an air purifier.

Figure 2:
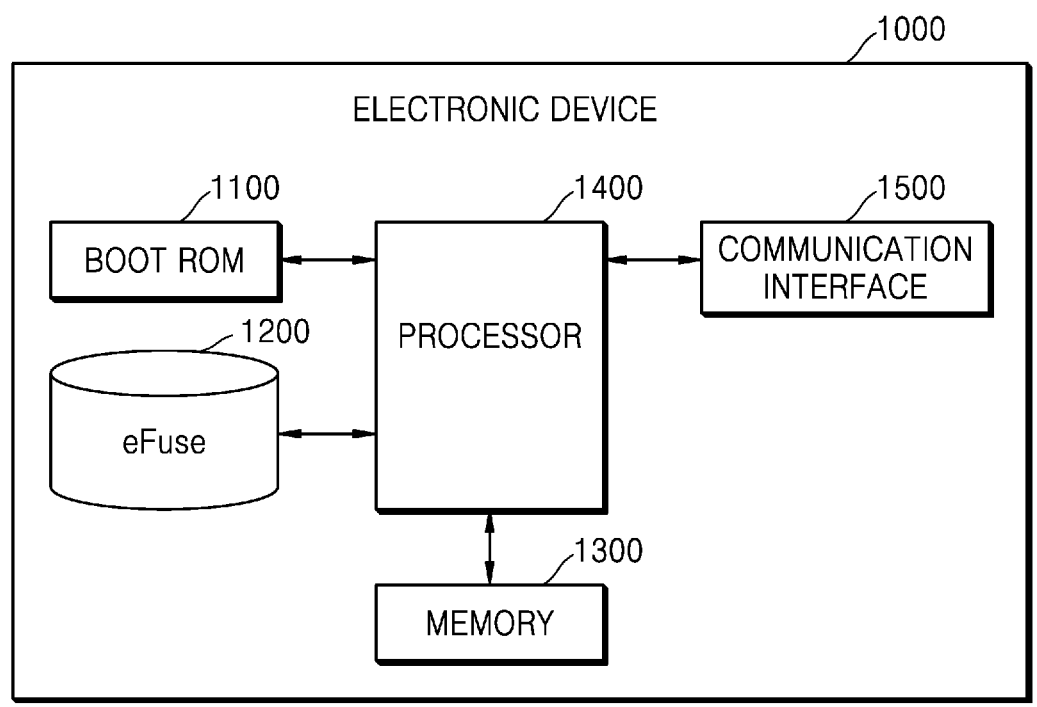
FIG. 2 is a block diagram of a structure of an electronic device according to an embodiment of the disclosure.

Referring to FIG. 1, the electronic device 1000 may record an encryption key stored in an external memory card 2000 in an eFuse (e.g., eFuse 1200 of FIG. 2). According to an embodiment, the electronic device 1000 may identify whether there is a pre-stored private key in the eFuse 1200, which is an internal component, and, when it is identified that the encryption key is not stored, the electronic device 1000 may boot through a special system stored in the external memory card 2000 through a multi-booting mode and write the encryption key to the eFuse 1200 by using a special system mode. The 'special system' is a boot loader customized to perform a key burn operation of recording an encryption key in the eFuse 1200. The external memory card 2000 is a flash memory-based external storage including at least one of a secure digital (SD) card, a micro SD card, an extreme digital (XD) card, or a memory stick (MC). However, embodiments of the disclosure are not limited thereto, and the external memory card 2000 may be implemented by using a universal serial bus (USB) memory.

The electronic device 1000 may obtain, from the external memory card 2000 or the server 3000, data for updating a boot loader with a secure system capable of performing secure booting, and may update the boot loader by using the update data. The server 3000 may store data for updating the boot loader with the secure system.

According to an embodiment, the electronic device 1000 may identify whether the boot loader stored in a memory (e.g., memory 1300 of FIG. 2) is a secure system or a normal system, and may determine a booting mode for updating the boot loader, based on a result of the identification. According to an embodiment, when the boot loader stored in the memory 1300 is a secure system, the electronic device 1000 may determine the booting mode as a multi-booting mode, and may perform booting by using the special system stored in the external memory card 2000. According to another embodiment, when the boot loader stored in the memory 1300 is a normal system, the electronic device 1000 may determine the booting mode as an update mode for updating the boot loader. In this case, the electronic device 1000 may update the boot loader with the secure system by using the special system stored in the external memory card 2000 or the update data received from the server 3000.

The electronic device 1000 may perform secure booting by decrypting the boot loader updated with the secure system by using the encryption key recorded in the eFuse 1200.

According to the prior art, secure booting is applied to an electronic device by using a method of directly recording a private key to the eFuse 1200 by using an additional program provided by a manufacturer of a processor. In particular, in order to install a secure system for secure booting, a method of recording a private key by applying programs provided by processor manufacturers one by one need to be used in a process of mass-producing a large number of electronic devices in a factory. However, a method of recording a private key by applying programs respectively provided by a manufacturer for a plurality of mass-produced electronic devices one by one requires a lot of production time and cost.

The electronic device 1000 according to an embodiment of the disclosure may identify in advance whether there is a private key pre-stored in the eFuse 1200 and whether the boot loader is a secure system, record an encryption key by using a special system provided by an external device, for example, the external memory card 2000 or the server 3000, by selectively applying a multi-booting mode or a boot loader update mode according to the result of the identification, and update the boot loader with the secure system. Accordingly, the electronic device 1000 according to the disclosure may save time and costs for applying secure booting and improve efficiency in a mass production process of mass-producing a plurality of electronic devices. In addition, the electronic device 1000 according to the disclosure may apply secure booting without an additional program provided by a manufacturer.

FIG. 2 is a block diagram illustrating components of an electronic device according to an embodiment of the disclosure.

An electronic device (e.g., the electronic device 1000 of FIG. 1) may be an IoT device that performs wired/wireless data communication with an external device or a server through a communication interface 1500 and perform a function or operation by executing an application. The electronic device 1000 may be, for example, a refrigerator, an electric oven, an air conditioner, a washing machine, a television, or an air purifier, but embodiments of the disclosure are not limited thereto.

Referring to FIG. 2, an electronic device 1000 may include a boot ROM 1100, an eFuse 1200, a memory 1300, a processor 1400, and a communication interface 1500. The boot ROM 1100, the eFuse 1200, the memory 1300, the processor 1400, and the communication interface 1500 may be mounted on a printed circuit board (PCB), and may be electrically and/or physically connected to each other. The components shown in FIG. 2 are only according to an embodiment of the disclosure, and the components included in the electronic device 1000 are not limited to those shown in FIG. 2. The electronic device 1000 may not include some of the components illustrated in FIG. 2, and may further include components not illustrated in FIG. 2. For example, the electronic device 1000 may further include a display that displays an execution screen of an application, a graphic UI, or an image captured by a camera. According to an embodiment, the display may be configured as a touch screen that receives a user's touch input.

The boot ROM 1100 is a read only memory (ROM) that stores program codes necessary for booting the electronic device 1000. ROM boot codes for the processor 1400 to call the boot loader stored in the memory 1300 may be stored in the boot ROM 1100. When power is supplied to the electronic device 1000 or is reset, the boot loader may be executed as the ROM boot codes stored in the boot ROM 1100 are executed, and booting may be performed while an OS is being operated by the execution of the boot loader.

The eFuse 1200 is a memory device that stores a private key for performing secure booting. The eFuse 1200 may be a One Time Programmable (OTP) memory device having a private key written thereto only once. The private key recorded in the eFuse 1200 may not be changed. According to an embodiment, the private key may not be stored in the eFuse 1200, and the private key may be recorded through a key burn process using the special system stored in the external memory card 2000 (see FIG. 1).

The memory 1300 stores program codes or instructions executed by the processor 1400. According to an embodiment, the memory 1300 may store the boot loader. The memory 1300 may be configured as a non-volatile memory including at least one of, for example, a flash memory, a hard disk, a multimedia card micro type, read-only memory (ROM), electrically erasable programmable ROM (EEPROM), and programmable ROM (PROM). According to an embodiment, the memory 1300 may be an embedded multi-media card (eMMC).

The processor 1400 may execute a program code or one or more instructions stored in the memory 1300. The processor 1400 may include hardware components that perform arithmetic, logic, input/output operations and signal processing. The processor 1400 may include, but is not limited to, at least one of a central processing unit, a microprocessor, a graphics processing unit, an application processor, application specific integrated circuits (ASICs), digital signal processors (DSPs), digital signal processing devices (DSPDs), programmable logic devices (PLDs), and field programmable gate arrays (FPGAs). The processor 1400 is illustrated as a single element in FIG. 2, but embodiments of the disclosure are not limited thereto. According to an embodiment, the processor 1400 may be provided as one or in plurality.

According to an embodiment, the processor 1400 may be configured as a dedicated hardware chip that performs AI learning.

According to an embodiment, the processor 1400 may be configured as hardware in the form of a System on Chip (SoC) integrated as one including the boot ROM 1100 and the eFuse 1200.

The processor 1400 may call and execute the boot loader stored in the memory 1300 by executing a ROM boot code stored in the boot ROM 1100 in response to power being supplied to the electronic device 1000 or being reset.

After the boot loader is executed, the processor 1400 identifies whether a private key is stored in the eFuse 1200. When a private key is stored in the eFuse 1200, booting is possible only when the boot loader is a secure system capable of performing secure booting. When the private key is not stored in the eFuse 1200, booting is possible even when the boot loader is a normal system that has nothing to do with the private key.

The processor 1400 may identify whether the boot loader stored in the memory 1300 is a secure system that executes secure booting by using a private key.

The processor 1400 may determine a booting mode, based on a result of the identification. When the boot loader is identified as a secure system for performing secure booting, the processor 1400 may identify whether the electronic device 1000 includes a boot loader supporting multi-booting, and may determine the booting mode as a multi-booting mode. Here, the 'multi booting mode' refers to a mode in which two or more OSs are selected and booted. The processor 1400 may use a boot loader other than the boot loader pre-stored in the memory 1300 through the multi-booting mode. According to an embodiment, the processor 1400 may perform booting by using the special system stored in the external memory card 2000 (see FIG. 1). According to an embodiment, the 'special system' stored in the external memory card 2000 may be a boot loader customized to perform a key burn operation that records an encryption key in the eFuse 1200. The special system may be stored in the external memory card 2000, but embodiments of the disclosure are not limited thereto. According to an embodiment, the special system may be stored in a USB memory or may be stored in the server 3000 (see FIG. 1).

The processor 1400 may perform booting by loading the special system stored in the external memory card 2000 through a multi-booting mode, and may execute the special system to record an encryption key in the eFuse 1200. According to an embodiment, the processor 1400 may generate a decryption key by decrypting an encryption key included in the special system, and may record the generated decryption key in the eFuse 1200. An embodiment in which the processor 1400 records an encryption key in the eFuse 1200 will be described in detail with reference to FIGS. 4 and 5.

When the boot loader is identified as a normal system capable of booting without a private key, the processor 1400 may determine the booting mode as an update mode. The 'update mode' is a mode in which a boot loader is updated using update data included in the special system stored in the external memory card 2000 (see FIG. 1). According to an embodiment, the processor 1400 may obtain special system update data from the external memory card 2000 and update the normal system pre-stored in the memory 1300 with the special system by using the update data.

After updating the boot loader with the special system, the processor 1400 may reboot the electronic device 1000. After rebooting, the processor 1400 may identify again whether a private key is stored in the eFuse 1200, and may identify whether the boot loader stored in the memory 1300 is a secure system. After the boot loader is updated with the special system, the processor 1400 may identify that the boot loader stored in the memory 1300 is a special system, and may execute the special system to perform a key burn that records the encryption key in the eFuse 1200. Because the operation that records the encryption key in the eFuse 1200 by using the special system is the same as the case where the boot loader is a secure system, redundant descriptions thereof will be omitted.

After performing the key burn operation, the processor 1400 may update the boot loader stored in the memory 1300 with a secure system by using the special system stored in the external memory card 2000. However, embodiments of the disclosure are not limited thereto. According to another embodiment, the processor 1400 may receive update data for updating the boot loader with a secure system from the server 3000 (see FIG. 1) by using the communication interface 1500, and may update the boot loader stored in the memory 1300 with a secure system by using the received update data. An embodiment in which the processor 1400 updates a normal system with a special system through the update mode, records the encryption key in the eFuse 1200, and then updates the special system with the secure system will be described in detail with reference to FIGS. 6A to 6C, 7, and 8.

After the boot loader is updated with the secure system, the processor 1400 may reboot the electronic device 1000, and then may decrypt the boot loader by using the encryption key recorded in the eFuse 1200, thereby performing secure booting.

Figure 3:
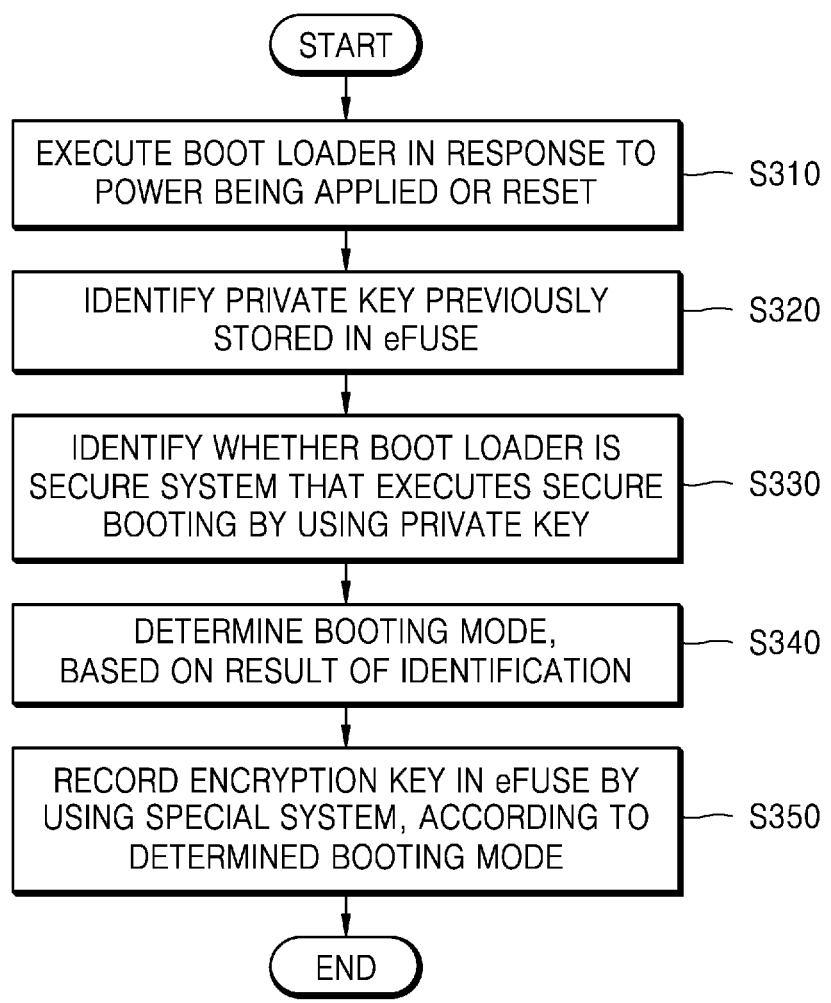
FIG. 3 is a flowchart of an operation method of an electronic device according to an embodiment of the disclosure.

FIG. 3 is a flowchart of an operation method of an electronic device according to an embodiment of the disclosure.

Referring to FIG. 3, in operation S310, an electronic device (e.g., the electronic device 1000 of FIG. 1) executes a boot loader in response to power being applied or reset. 'Reset' refers to a process in which power applied to the electronic device 1000 is turned off and then power is applied again for rebooting. According to an embodiment, the electronic device 1000 may execute the boot loader stored in the memory 1300 (see FIG. 2) by executing a ROM boot code previously stored in the boot ROM.

In operation S320, the electronic device 1000 identifies the private key previously stored in the eFuse 1200 (see FIG. 2). When a private key is stored in the eFuse 1200, booting is possible only when the boot loader is a secure system capable of performing secure booting. When the private key is not stored in the eFuse 1200, booting is possible when the boot loader is a normal system that has nothing to do with the private key. However, when the boot loader is a secure system, booting is impossible without private keys.

In operation S330, the electronic device 1000 identifies whether the boot loader is a secure system that executes secure booting by using a private key. According to an embodiment, the electronic device 1000 may identify whether the boot loader stored in the memory 1300 is a secure system booted only when a private key is stored or a normal system capable of booting without a private key.

In operation S340, the electronic device 1000 determines the booting mode, based on a result of the identification. According to an embodiment, when the boot loader is identified as a secure system for performing secure booting, the processor 1400 may identify whether multi-booting is possible, and may determine the booting mode as a multi-booting mode. The 'multi booting mode' refers to a mode in which two or more OSs are selected and booted. According to another embodiment, when the boot loader is identified as a normal system capable of secure booting without a private key, the electronic device 1000 may determine the booting mode as an update mode. The 'update mode' is a mode in which a boot loader is updated using update data included in the special system stored in the external memory card 2000 (see FIG. 1).

In operation S350, the electronic device 1000 records an encryption key in the eFuse 1200 by using a special system, according to the determined booting mode. The electronic device 1000 may load a special system from the external memory card 2000 (see FIG. 1) and perform a key burn operation that records encryption key in the eFuse 1200. According to an embodiment, the electronic device 1000 may load a special system stored in a USB memory and record the encryption key in the eFuse 1200. According to an embodiment, the electronic device 1000 may generate a decryption key by decrypting an encryption key included in the special system, and may record the generated decryption key in the eFuse 1200.

Figure 4:
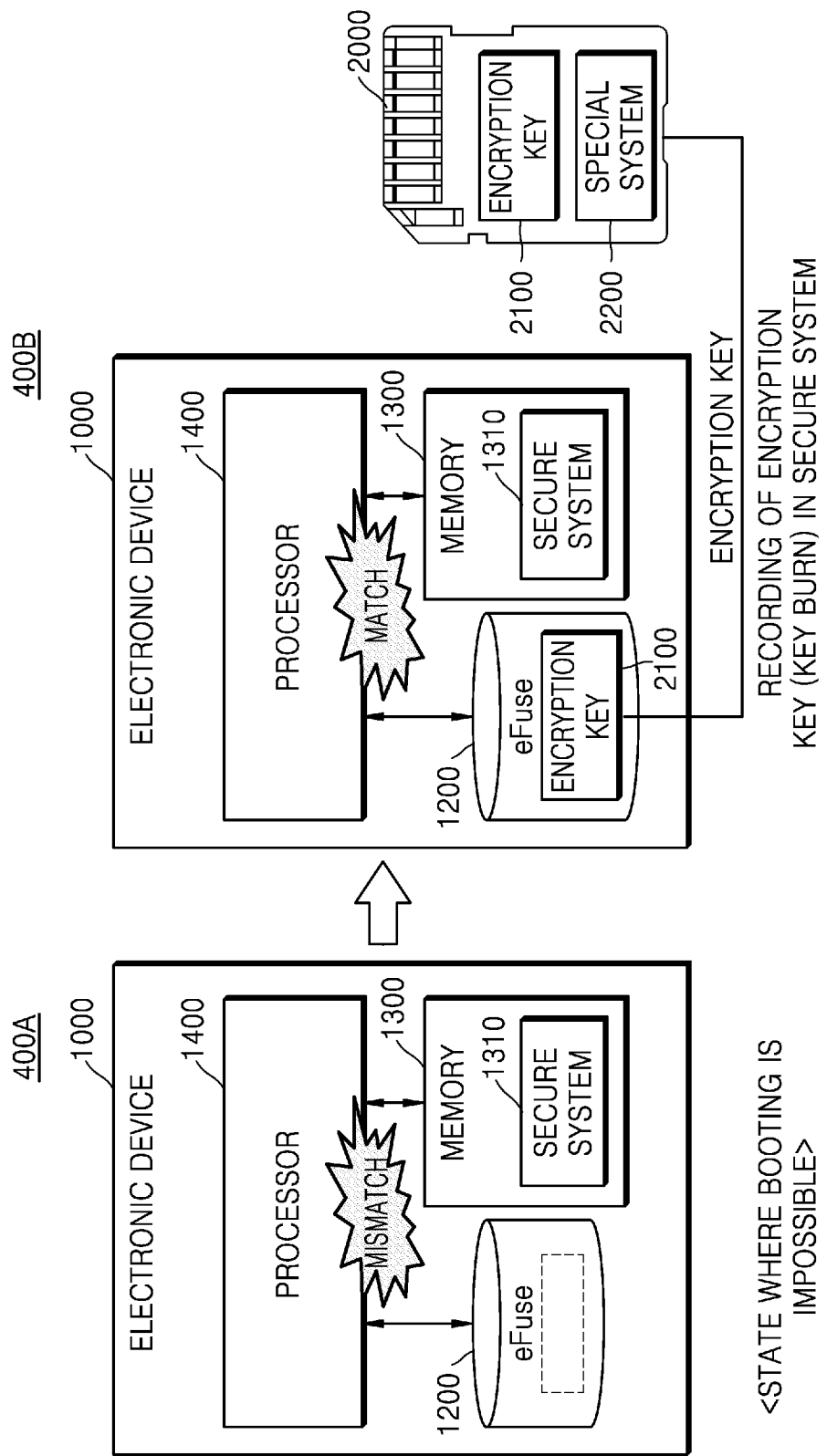
FIG. 4 is a diagram illustrating an embodiment in which an electronic device records an encryption key in an eFuse according to an embodiment of the disclosure.

FIG. 4 is a diagram illustrating an embodiment in which an electronic device records an encryption key in an eFuse according to an embodiment of the disclosure.

Referring to FIG. 4, an electronic device (e.g., the electronic device 1000 of FIG. 1) may include an eFuse 1200, a memory 1300, and a processor 1400. FIG. 4 illustrates essential components for explaining the embodiment in which the electronic device 1000 records an encryption key in the eFuse 1200. The components included in the electronic device 1000 are not limited to those shown in FIG. 4.

In an unbootable state 400A shown on the left side of FIG. 4, the boot loader stored in the memory 1300 of the electronic device 1000 is a secure system 1310, and an encryption key is not stored in the eFuse 1200. When the boot loader stored in the memory 1300 is the secure system 1310, an encryption key is essential, and, when the encryption key is not stored in the eFuse 1200, a mismatch between the boot loader and the eFuse 1200 occurs. In this case, even when power is applied to the processor 1400, booting is impossible and a system is terminated.

The processor 1400 may determine a booting mode as a multi-booting mode in which booting is performed with a boot loader other than the boot loader stored in the memory 1300, in order to prevent the mismatch and boot into a secure system. After determining the multi-booting mode, the processor 1400 may boot with a special system 2200 stored in the external memory card 2000 by reading the program code of the special system 2200. Although the special system 2200 is shown as being stored in the external memory card 2000 in FIG. 4, embodiments of the disclosure are not limited thereto. According to an embodiment, the special system 2200 may be stored in a USB memory, and the processor 1400 may boot with the special system 2200 by reading program code of the special system 2200 from the USB memory.

Referring to a key burn operation 400B that records a private key in the secure system shown on the right side of FIG. 4, the processor 1400 may record an encryption key 2100 stored in the external memory card 2000 in the eFuse 1200 after booting using the special system 2200. According to an embodiment, the processor 1400 may generate a decryption key by decrypting the encryption key 2100 obtained from the external memory card 2000, and may record the generated decryption key in the eFuse 1200. When a private key is recorded in the eFuse 1200, the private key is matched with the secure system 1310 stored in the memory 1300, thereby enabling secure booting.

Figure 5:
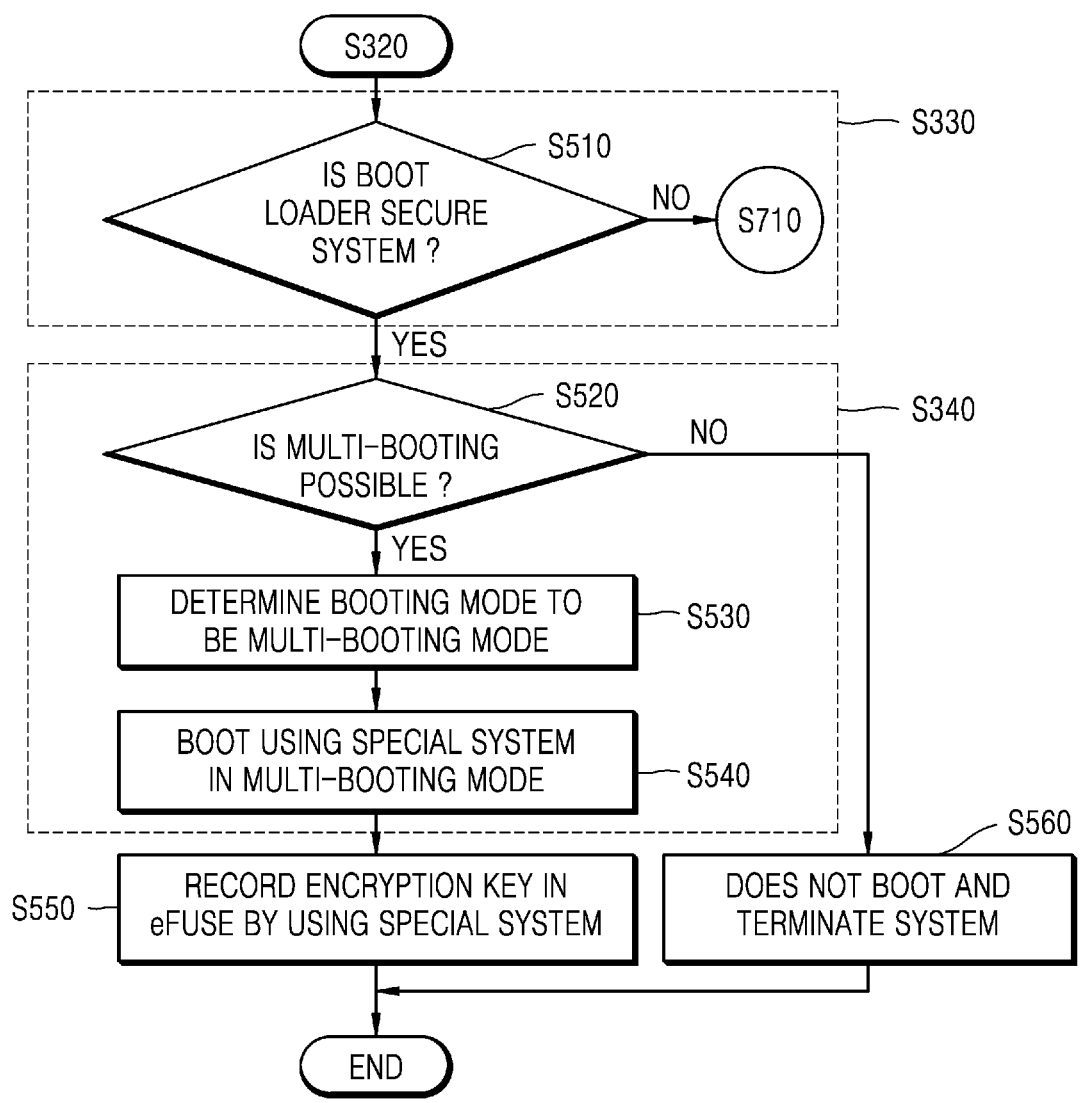
FIG. 5 is a flowchart of a method, performed by an electronic device according to an embodiment of the disclosure, of recording an encryption key in an eFuse, according to an embodiment of the disclosure.

FIG. 5 is a flowchart of a method, performed by an electronic device, of recording an encryption key in an eFuse, according to an embodiment of the disclosure.

Operation S510 of FIG. 5 is a detailed version of operation S330 of FIG. 3. Operation S510 is performed after operation S320 of FIG. 3 is performed. Operations S520 through S540 of FIG. 5 are detailed operations of operation S340 of FIG. 3.

Referring to FIG. 5, in operation S510, an electronic device (e.g., the electronic device 1000 of FIG. 1) identifies whether the boot loader is a secure system. The security system is a boot loader that can boot only when a private key is stored in an eFuse 1200 and cannot boot when there is no private key.

When the boot loader is identified as a secure system, the electronic device 1000 identifies whether multi-booting is possible, in operation S520. The 'multi-booting' refers to a booting mode in which booting is performed using a boot loader other than the boot loader stored in the memory 1300 (see FIG. 4) of the electronic device 1000. For example, the electronic device 1000 may perform multi-booting by using the boot loader stored in the external memory card 2000 (see FIG. 4).

When the boot loader is identified as a secure system (e.g., in operation S710), the electronic device 1000 identifies whether the boot loader is a normal system capable of booting without private keys. Operation S710 will be described in greater detail later with reference to FIG. 7.

When it is identified that multi-booting is possible, the electronic device 1000 determines the booting mode to be the multi-booting mode, in operation S530. For example, when there is an external memory card 2000 (see FIG. 4) connected to the electronic device 1000 and the external memory card 2000 has a boot loader executable for multi-booting, the electronic device 1000 may determine that multi-booting is possible.

In operation S540, the electronic device 1000 boots using a special system in the multi-booting mode. According to an embodiment, the electronic device 1000 may perform booting with the special system stored in the external memory card 2000 (see FIG. 4), by reading a program code of the special system.

In operation S550, the electronic device 1000 records the encryption key in the eFuse 1200 by using the special system. Because a key burn that records the encryption key in the eFuse 1200 is the same as operation S350 shown in FIG. 3, redundant descriptions thereof will be omitted.

When it is identified that multi-booting is not possible, the electronic device 1000 does not boot, and the system is terminated, in operation S560. For example, when there is no boot loader accessible by the electronic device 1000 other than the boot loader stored in the memory 1300 (see FIG. 4), the electronic device 1000 determines that multi-booting is not possible. According to an embodiment, the electronic device 1000 may determine whether there is an external memory connected to the electronic device 1000 in order to search for another boot loader, and, when there is no external memory, may determine that multi-booting is not possible. According to another embodiment, the electronic device 1000 may determine whether multi-booting is possible by identifying whether a boot loader other than the boot loader stored in the memory 1300 of FIG. 4 is stored in an internal storage space of the electronic device 1000, and, in case that no other boot loader is stored in the internal storage space of the electronic device 1000, may determine that multi-booting is not possible.

Figure 6A:
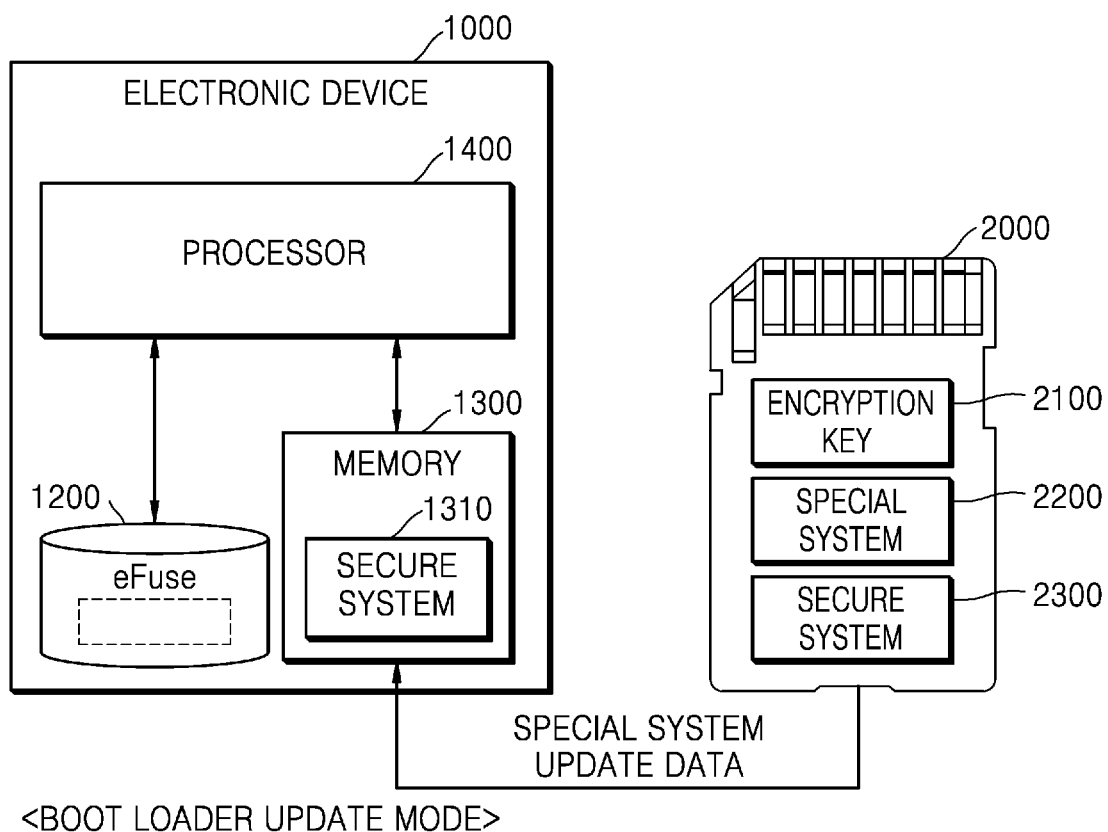
FIG. 6A is a diagram illustrating an embodiment in which an electronic device updates a boot loader according to an embodiment of the disclosure.

FIG. 6A is a diagram illustrating an embodiment in which an electronic device updates a boot loader with a special system according to an embodiment of the disclosure.

Figure 6B:
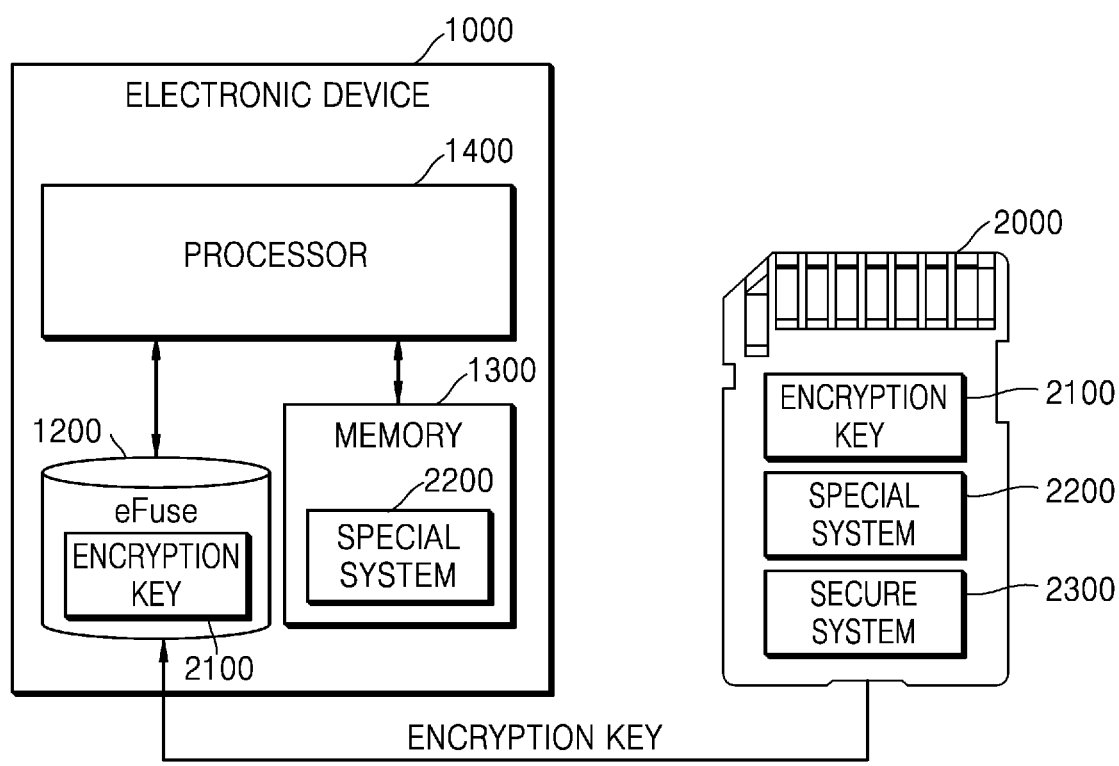
FIG. 6B is a diagram illustrating an embodiment in which an electronic device records an encryption key in an eFuse according to an embodiment of the disclosure.

FIG. 6B is a diagram illustrating an embodiment in which an electronic device records an encryption key in an eFuse according to an embodiment of the disclosure.

Figure 6C:
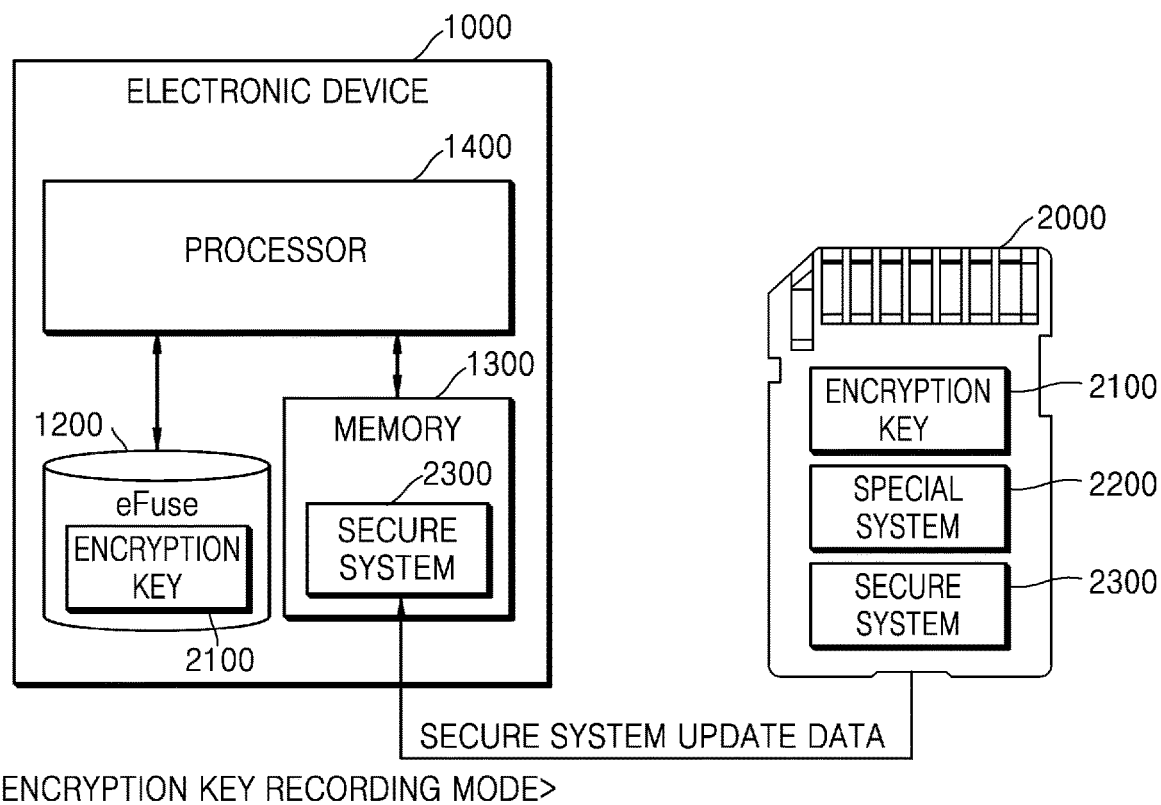
FIG. 6C is a diagram illustrating an embodiment in which an electronic device updates a boot loader according to an embodiment of the disclosure.

FIG. 6C is a diagram illustrating an embodiment in which an electronic device updates a boot loader with a secure system according to an embodiment of the disclosure.

FIGS. 6A to 6C may be sequentially performed. After updating the boot loader with a special system 2200, an electronic device (e.g., the electronic device 1000 of FIG. 1) may record an encryption key in an eFuse 1200, and then update the boot loader with a secure system 2300.

Referring to FIG. 6A, an electronic device 1000 may include an eFuse 1200, a memory 1300, and a processor 1400. In the embodiment shown in FIG. 6A, an encryption key may not be stored in the eFuse 1200, and a normal system 1320 may be stored as a boot loader in the memory 1300. Because the boot loader stored in the memory 1300 is a normal system capable of booting without an encryption key, booting is possible.

The electronic device 1000 may obtain, from the external memory card 2000, update data capable of updating a boot loader with the special system 2200, in order to record an encryption key in the eFuse 1200. The electronic device 1000 may update the normal system 1320, which is the boot loader stored in the memory 1300, with the special system 2200, by using the obtained update data.

Referring to FIG. 6B, the special system 2200 may be stored in the memory 1300 through the boot loader update performed in FIG. 6A. The processor 1400 may boot using the special system 2200 and record the encryption key 2100 stored in the external memory card 2000 in the eFuse 1200. According to an embodiment, the processor 1400 may generate a decryption key by decrypting the encryption key 2100 by using the special system 2200 stored in the memory 1300, and may perform a key burn that records the generated decryption key in the eFuse 1200.

Referring to FIG. 6C, the encryption key 2100 may be stored in the eFuse 1200 through the key burn performed in FIG. 6B. The processor 1400 may obtain, from the external memory card 2000, update data for updating a boot loader with the secure system 2300. The processor 1400 may update the boot loader stored in the memory 1300 with the secure system 2300, by using the obtained update data.

Although the processor 1400 is illustrated in FIG. 6C as obtaining update data for updating a boot loader from the external memory card 2000, embodiments of the disclosure are not limited thereto. According to another embodiment, the electronic device 1000 may include the communication interface 1500 (see FIG. 2) configured to transmit and receive data to and from the server 3000 (see FIG. 1), and the processor 1400 may receive, from the server 3000 through the communication interface 1500, update data for updating the boot loader with the secure system 2300. The processor 1400 may update the boot loader stored in the memory 1300 with the secure system 2300, by using the update data received from the server 3000.

By sequentially performing the operations shown in FIGS. 6A to 6C, the electronic device 1000 may record an encryption key in the eFuse 1200 and update the boot loader with the secure system 2300. Accordingly, the electronic device 1000 may perform secure booting by using the secure system 2300.

Referring to FIGS. 6A to 6C, the encryption key 2100, the program code or instructions constituting the special system 2200, and the program code or instructions constituting the secure system 2300 are stored in the external memory card 2000. However, embodiments of the disclosure are not limited thereto. According to an embodiment, the encryption key 2100, the program code or instructions constituting the special system 2200, and the program code or instructions constituting the secure system 2300 may be stored in a USB memory or stored in the server 3000, and the processor 1400 may obtain data from the USB memory or the server 3000.

Figure 7:
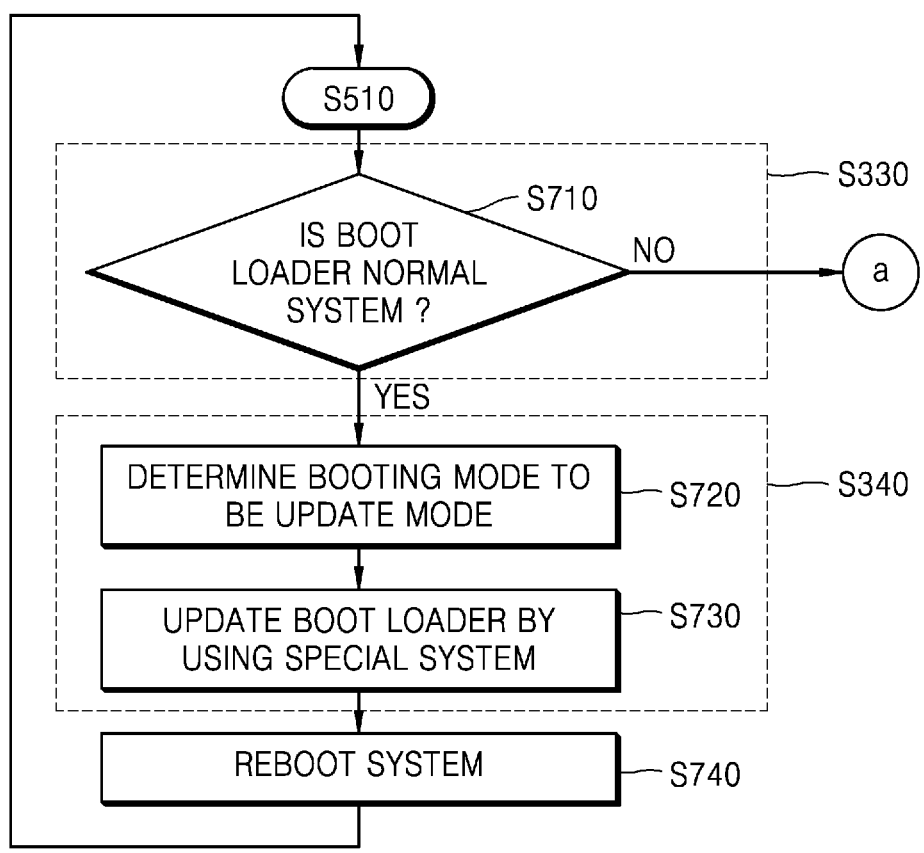
FIG. 7 is a flowchart of a method, performed by an electronic device, of updating a boot loader, according to an embodiment of the disclosure.

FIG. 7 is a flowchart of a method, performed by an electronic device, of updating a boot loader, according to an embodiment of the disclosure.

Operation S710 of FIG. 7 is a detailed version of operation S330 of FIG. 3. Operations S720 and S730 of FIG. 7 are detailed operations of operation S340 of FIG. 3.

Referring to FIG. 7, operation S710 may be performed when the boot loader is not a secure system in operation S510 shown in FIG. 5. In operation S710, an electronic device (e.g., the electronic device 1000 of FIG. 1) identifies whether the boot loader is a normal system. The 'normal system' is a boot loader capable of booting without a private key.

When the boot loader is identified as a normal system, the electronic device 1000 determines the booting mode to be an update mode, in operation S720. The 'update mode' is a mode in which a boot loader is updated by obtaining update data from the external memory card 2000 (see FIGS. 6A to 6C) or the USB memory.

In operation S730, the electronic device 1000 updates a boot loader by using a special system. According to an embodiment, the special system may be stored in the external memory card 2000. However, embodiments of the disclosure are not limited thereto, and the special system may be stored in the USB memory. The electronic device 1000 may obtain, from the external memory card 2000 or the USB memory, update data for updating a boot loader with a special system, and may update the boot loader as a special system by using the update data.

In operation S740, the electronic device 1000 reboots the system when the update of the boot loader is completed.

The electronic device 1000 may perform again from operation S510 after rebooting the system. Because the boot loader has been updated with a special system in operation S730, after rebooting, it is identified in operation S710 that the boot loader is not a normal system, and the method proceeds to operation ⓐ. Operation ⓐ will be described with reference to FIG. 8.

Figure 8:
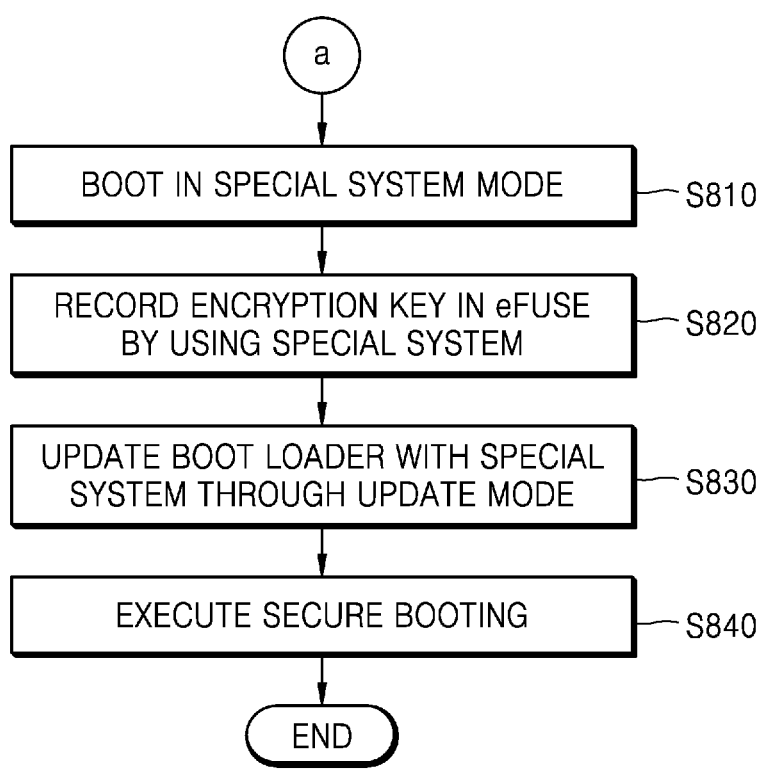
FIG. 8 is a flowchart of a method, performed by an electronic device, of performing secure booting after updating a boot loader with a secure system, according to an embodiment of the disclosure.

FIG. 8 is a flowchart of a method, performed by an electronic device, of performing secure booting after updating a boot loader with a secure system, according to an embodiment of the disclosure.

Referring to FIG. 8, operation S810 is performed after operation ⓐ of FIG. 7. In operation S810, an electronic device (e.g., the electronic device 1000 of FIG. 1) identifies that the boot loader is a special system, and boots in the special system mode.

In operation S820, the electronic device 1000 records an encryption key in an eFuse 1200 (see FIGS. 6A to 6C) by using a special system. Because a key burn that records the encryption key in the eFuse 1200 is the same as operation S350 shown in FIG. 3, redundant descriptions thereof will be omitted.

In operation S830, the electronic device 1000 updates a boot loader with a special system through an update mode. According to an embodiment, the electronic device 1000 may obtain, from the external memory card 2000 (see FIGS. 6A to 6C) or the USB memory, update data for updating a boot loader with a secure system. According to another embodiment, the electronic device 1000 may receive, from a server, update data for updating a boot loader. The electronic device 1000 may update the boot loader to the secure system by using the update data.

In operation S840, the electronic device 1000 executes secure booting. According to an embodiment, the electronic device 1000 may perform secure booting by decrypting the boot loader updated with the secure system by using the encryption key recorded in the eFuse 1200.

The program executed by the electronic device 1000 described above herein may be implemented as a hardware component, a software component, and/or a combination of hardware components and software components. The program may be executed by any system capable of executing computer readable instructions.

The software may include a computer program, a code, instructions, or a combination of one or more of the foregoing, and may constitute a processing device so that the processing device can operate as desired, or may independently or collectively instruction the processing device.

The software may be implemented as a computer program including instructions stored in computer-readable storage media. Examples of the computer-readable recording media include magnetic storage media (e.g., ROM, floppy disks, hard disks, etc.), and optical recording media (e.g., compact disc (CD)-ROMs, or digital versatile discs (DVDs)). The computer-readable storage media can be distributed over network coupled computer systems so that the computer-readable code is stored and executed in a distributive manner. These media can be read by the computer, stored in a memory, and executed by a processor.

Computer-readable storage media may be provided in the form of non-transitory storage media. Here, 'non-transitory' denotes that the storage medium does not include a signal and is tangible, but does not distinguish whether data is stored semi-permanently or temporarily in the storage medium. For example, the non-transitory recording medium may include a buffer in which data is temporarily stored.

Programs according to various embodiments disclosed herein may be provided by being included in computer program products. The computer program product, which is a commodity, may be traded between sellers and buyers.

Computer program products may include a software program and a computer-readable storage medium having the software program stored thereon. For example, computer program products may include a product in the form of a software program (e.g., a downloadable application) that is electronically distributed through device manufacturers or electronic markets (e.g., Google Play Store and AppStore). For electronic distribution, at least a portion of the software program may be stored on a storage medium or may be created temporarily. In this case, the storage medium may be a server of a manufacturer of a vehicle or the electronic device 1000, a server of an electronic market, or a storage medium of a relay server for temporarily storing a software program.

The computer program product may include a storage medium of the server 3000 or a storage medium of an electronic device, in a system composed of the electronic device 1000, the server 3000, and other electronic devices. Alternatively, if there is a third device (e.g., a smartphone) in communication with the electronic device 1000, the computer program product may include a storage medium of the third device. Alternatively, the computer program product may include the software program itself transmitted from the electronic device 1000 to an electronic device or the third device, or transmitted from the third device to the electronic device.

In this case, one of the electronic device 1000, the electronic device, and the third device may execute the computer program product to perform the methods according to the disclosed embodiments. Alternatively, at least two of the electronic device 1000, the electronic device, and the third device may execute the computer program product to distribute and perform the methods according to the disclosed embodiments.

For example, the electronic device 1000 may control another electronic device in communication with the electronic device 1000 to perform the methods according to the disclosed embodiments, by executing the computer program product stored in the memory 1300 of FIG. 2.

As another example, a third device may execute a computer program product to control an electronic device in communication with the third device to perform the methods according to the disclosed embodiments.

When the third device executes the computer program product, the third device may download the computer program product from the electronic device 1000 and execute the downloaded computer program product. Alternatively, the third device may execute a computer program product provided in a preloaded state to perform methods according to the disclosed embodiments.

While the disclosure has been shown and described with reference to various embodiments thereof, it will be understood by those of skilled in the art that various changes in form and details may be made therein without departing from the spirit and scope of the disclosure as defined by the appended claims and their equivalents.

What is claimed is:

1. An electronic device comprising:
   an eFuse storing a private key used in secure booting;
   a memory storing at least one program code associated with a boot loader; and
   a processor configured to execute the at least one program code,
   wherein the processor is further configured to:
      in response to power being applied to the electronic device or the power being reset, execute the boot loader stored in the memory,
      identify the private key pre-stored in the eFuse,
      identify whether the boot loader is a secure system that executes secure booting by using the private key,
      based on a result of the identifying of whether the boot loader is a secure system, determine a booting mode, and
      based on the determined booting mode, record an encryption key in the eFuse by loading a special system stored in an external memory card.

2. The electronic device of claim 1, wherein the processor is further configured to:
   in response to the boot loader being identified as the secure system that executes secure booting, identify whether multi-booting is possible using another boot loader different from the boot loader pre-stored in the memory.

3. The electronic device of claim 2, wherein the processor is further configured to:
   determine the booting mode to be a multi-booting mode, and
   boot by using the special system stored in the external memory card through the multi-booting mode.

4. The electronic device of claim 1, wherein the processor is further configured to:
   in response to the boot loader being identified as a normal system that does not perform secure booting, determine the booting mode to be an update mode, and
   update the boot loader by using the special system stored in the external memory card.

5. The electronic device of claim 4, wherein the processor is further configured to:
   after performing a key burn that records the encryption key in the eFuse, update the boot loader with the secure system.

6. The electronic device of claim 5, wherein the processor is further configured to:
   obtain, from the external memory card, update data including a program code for updating the boot loader with the secure system, and
   update the boot loader with the secure system by using the obtained update data.

7. The electronic device of claim 1, wherein the processor is further configured to:
   generate a decryption key by decrypting the encryption key by using the special system, and
   record the generated decryption key in the eFuse.

8. The electronic device of claim 1, wherein the processor is further configured to:
   in response to the electronic device being rebooted, perform secure booting by decrypting the boot loader by using the encryption key recorded in the eFuse.

9. A method of applying secure booting to an electronic device, the method comprising:
- in response to power being applied to the electronic device or the power being reset, executing a boot loader stored in a memory of the electronic device;
- identifying a private key pre-stored in an eFuse included in the electronic device;
- identifying whether the boot loader is a secure system that executes secure booting by using the private key;
- based on a result of the identifying of whether the boot loader is a secure system, determining a booting mode; and
- based on the determined booting mode, recording an encryption key in the eFuse by using a special system loaded from an external memory card.

10. The method of claim 9, further comprising:
- in response to the boot loader being identified as a secure system that executes secure booting, identifying whether multi-booting is possible using another boot loader different from the boot loader pre-stored in the memory.

11. The method of claim 10, further comprising:
- determining the booting mode to be a multi-booting mode; and
- booting using the special system stored in the external memory card through the multi-booting mode.

12. The method of claim 9, further comprising:
- in response to the boot loader being identified as a normal system that does not execute secure booting, determining the booting mode to be an update mode; and
- updating the boot loader by using the special system stored in the external memory card.

13. The method of claim 12, further comprising:
- after the recording of the encryption key in the eFuse, updating the boot loader with the secure system.

14. The method of claim 11, wherein the recording of the encryption data in the eFuse comprises:
- generating a decryption key by decrypting the encryption key by using the special system; and
- recording the decryption key in the eFuse.

15. A computer program product comprising a non-transitory computer-readable storage medium including instructions which, when executed by a processor of an electronic device, cause the electronic device to perform operations comprising:
- in response to power being applied to the electronic device or the power being reset, executing a boot loader stored in a memory of the electronic device;
- identifying whether a private key is stored in an eFuse included in the electronic device;
- identifying whether the boot loader is a secure system that executes secure booting by using the private key;
- based on a result of the identifying of whether the boot loader is a secure system, determining a booting mode; and
- based on the determined booting mode, recording an encryption key in the eFuse by using a special system loaded from an external memory card.

* * * * *